US012600416B2

(12) United States Patent
Gangstad

(10) Patent No.: US 12,600,416 B2
(45) Date of Patent: Apr. 14, 2026

(54) RETRACTABLE FENDER FLARE DEVICE

(71) Applicant: Paul Gangstad, Gig Harbor, WA (US)

(72) Inventor: Paul Gangstad, Gig Harbor, WA (US)

( * ) Notice: Subject to any disclaimer, the term of this patent is extended or adjusted under 35 U.S.C. 154(b) by 294 days.

(21) Appl. No.: 18/404,346

(22) Filed: Jan. 4, 2024

(65) Prior Publication Data

US 2025/0222989 A1      Jul. 10, 2025

(51) Int. Cl.
      *B62D 25/18*      (2006.01)
      *B62D 25/16*      (2006.01)
(52) U.S. Cl.
      CPC ......... *B62D 25/182* (2013.01); *B62D 25/163*
                                                  (2013.01)
(58) Field of Classification Search
      CPC ............................ B62D 25/182; B62D 25/163
      See application file for complete search history.

(56) References Cited

U.S. PATENT DOCUMENTS

| | | | |
|---|---|---|---|
| 4,169,608 | A | 10/1979 | Logan |
| 5,238,268 | A | 8/1993 | Logan |
| 5,340,154 | A | 8/1994 | Scott |
| 6,070,908 | A | 6/2000 | Skrzypchak |
| 9,352,786 | B1 * | 5/2016 | Martin ................. B62D 25/182 |
| 9,969,436 | B1 * | 5/2018 | Gause ................. B60R 16/023 |
| D898,640 | S | 10/2020 | Rose |
| 2004/0164539 | A1 * | 8/2004 | Bernard ............... B62D 25/182 280/848 |
| 2009/0273176 | A1 * | 11/2009 | Ulgen .................. B62D 25/182 280/851 |
| 2017/0137070 | A1 * | 5/2017 | Proctor ............... B62D 25/182 |
| 2018/0127039 | A1 * | 5/2018 | Freytag ............... B62D 25/166 |
| 2018/0251161 | A1 * | 9/2018 | Wilson ................. B62D 25/182 |
| 2019/0118874 | A1 * | 4/2019 | Ibañez Moreira .... F16D 65/807 |
| 2019/0300068 | A1 | 10/2019 | Procuik |
| 2022/0258809 | A1 * | 8/2022 | Kim ........................ B62D 37/02 |
| 2024/0034415 | A1 * | 2/2024 | Williams ............. B62D 25/182 |
| 2025/0050952 | A1 * | 2/2025 | Cressman ............ B62D 25/163 |

FOREIGN PATENT DOCUMENTS

CA          1119213          3/1982

* cited by examiner

*Primary Examiner* — Brian L Swenson

(57)                    ABSTRACT

A retractable fender flare device includes a plurality of mounting tracks each mounted in a respective wheel well in a vehicle. A plurality of fender flares is each movably attached to a respective one of the mounting tracks. Each of the plurality of fender flares is positionable in a deployed position to protect the vehicle from dirt and debris kicked up by tires of the vehicle and each of the plurality of fender flares is positionable in a retracted position. A plurality of actuators is attached to a respective one of the mounting tracks for urging the respective fender flare into the deployed position and the retracted position. A control panel is mounted within a cab of the vehicle to facilitate a driver of the vehicle to control the actuators for moving the fender flares between the deployed position and the retracted position.

12 Claims, 13 Drawing Sheets

RETRACTABLE FENDER FLARE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fender flare devices and more particularly pertains to a new fender flare device for deploying or retracting fender flares on a vehicle. The device includes a plurality of mounting track each mounted in a respective wheel well of a vehicle and a plurality of fender flares each slidably attached to a respective mounting track. The device includes a plurality of actuators each attached to a respective fender flare for urging the fender flares between a deployed position and a retracted position. The device includes a control panel that is mounted in the vehicle for controlling the actuators.

(2) Description of Related Art Including Information Disclosed Under 37 CFR 1.97 and 1.98

The prior art relates to fender flare devices including a variety of fender flare devices that are fixedly mounted to a respective wheel well in a vehicle. In no instance does the prior art disclose a retractable fender flare device that includes a plurality of fender flares each movably mounted in a respective wheel well of a vehicle and a plurality of actuators each attached to a respective fender flare for urging the respective fender flare between a deployed position and a retracted position and a control panel mounted in the vehicle for controlling the actuators.

BRIEF SUMMARY OF THE INVENTION

An embodiment of the disclosure meets the needs presented above by generally comprising a plurality of mounting tracks each mounted in a respective wheel well in a vehicle. A plurality of fender flares is each movably attached to a respective one of the mounting tracks. Each of the plurality of fender flares is positionable in a deployed position to protect the vehicle from dirt and debris kicked up by tires of the vehicle and each of the plurality of fender flares is positionable in a retracted position. A plurality of actuators is attached to a respective one of the mounting tracks for urging the respective fender flare into the deployed position and the retracted position. A control panel is mounted within a cab of the vehicle to facilitate a driver of the vehicle to control the actuators for moving the fender flares between the deployed position and the retracted position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
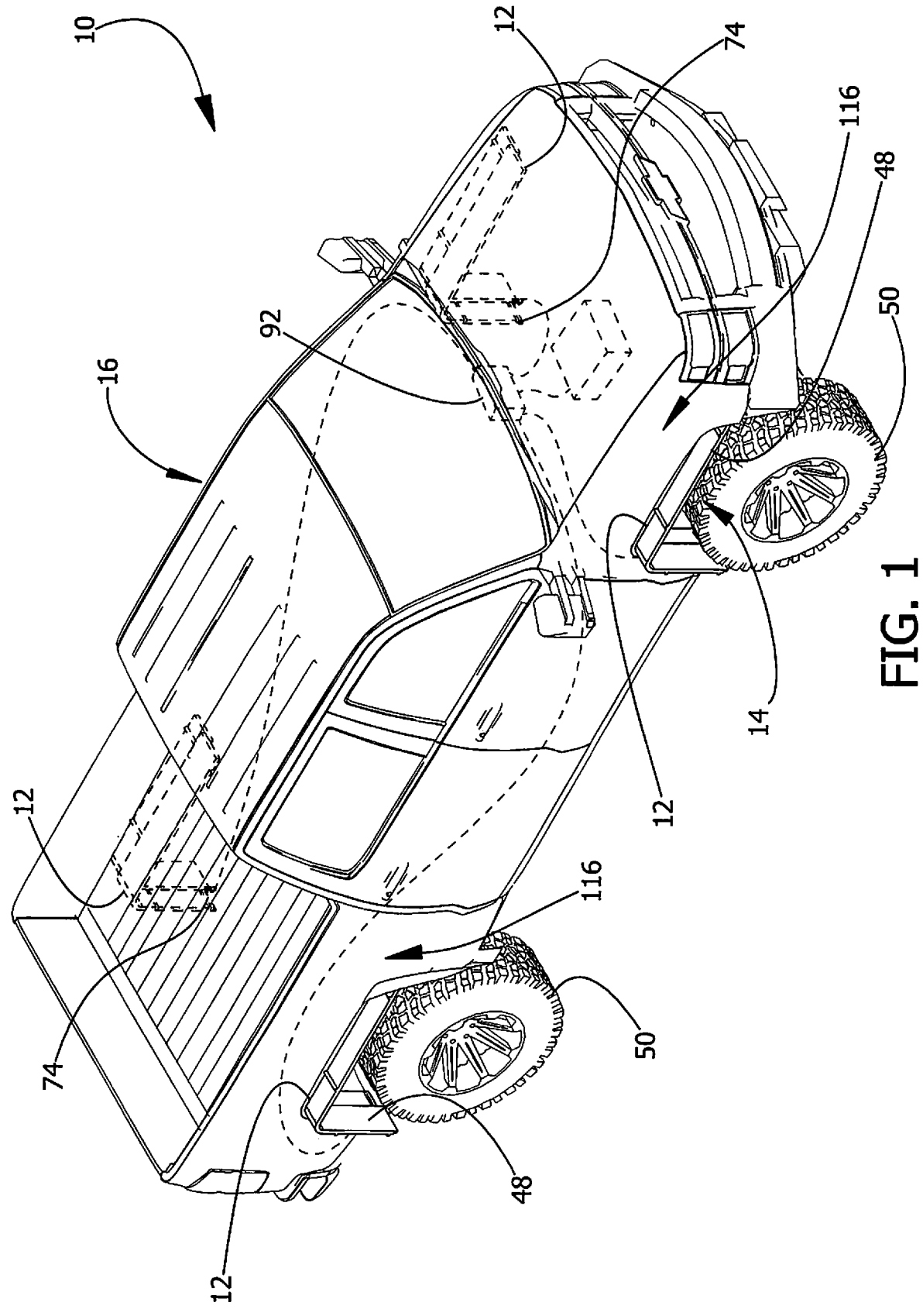
FIG. 1 is a top perspective phantom view of a retractable fender flare device according to an embodiment of the disclosure.
Figure 2:
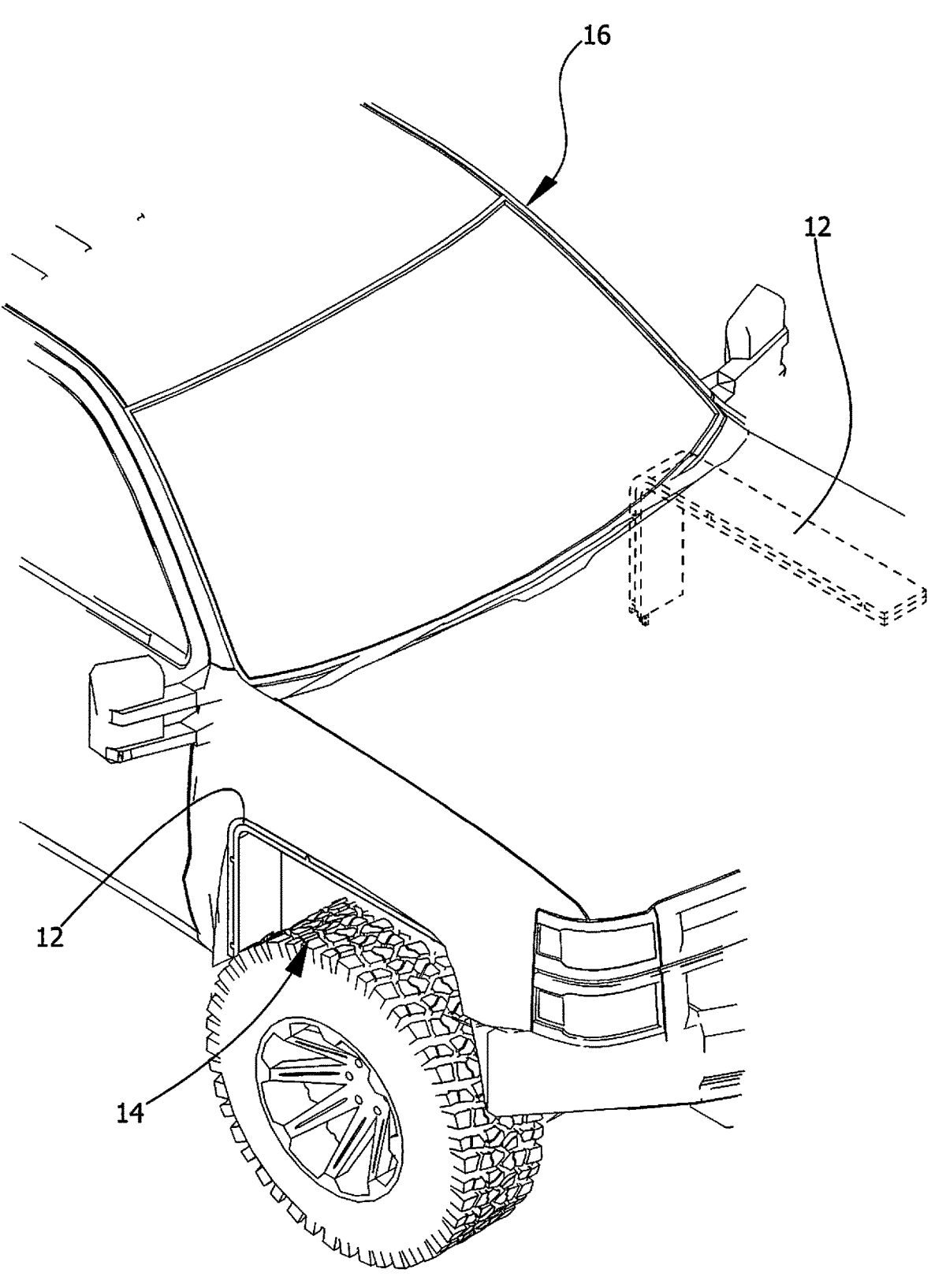
FIG. 2 is a phantom perspective view of a mounting track and a fender flare of an embodiment of the disclosure.
Figure 3:
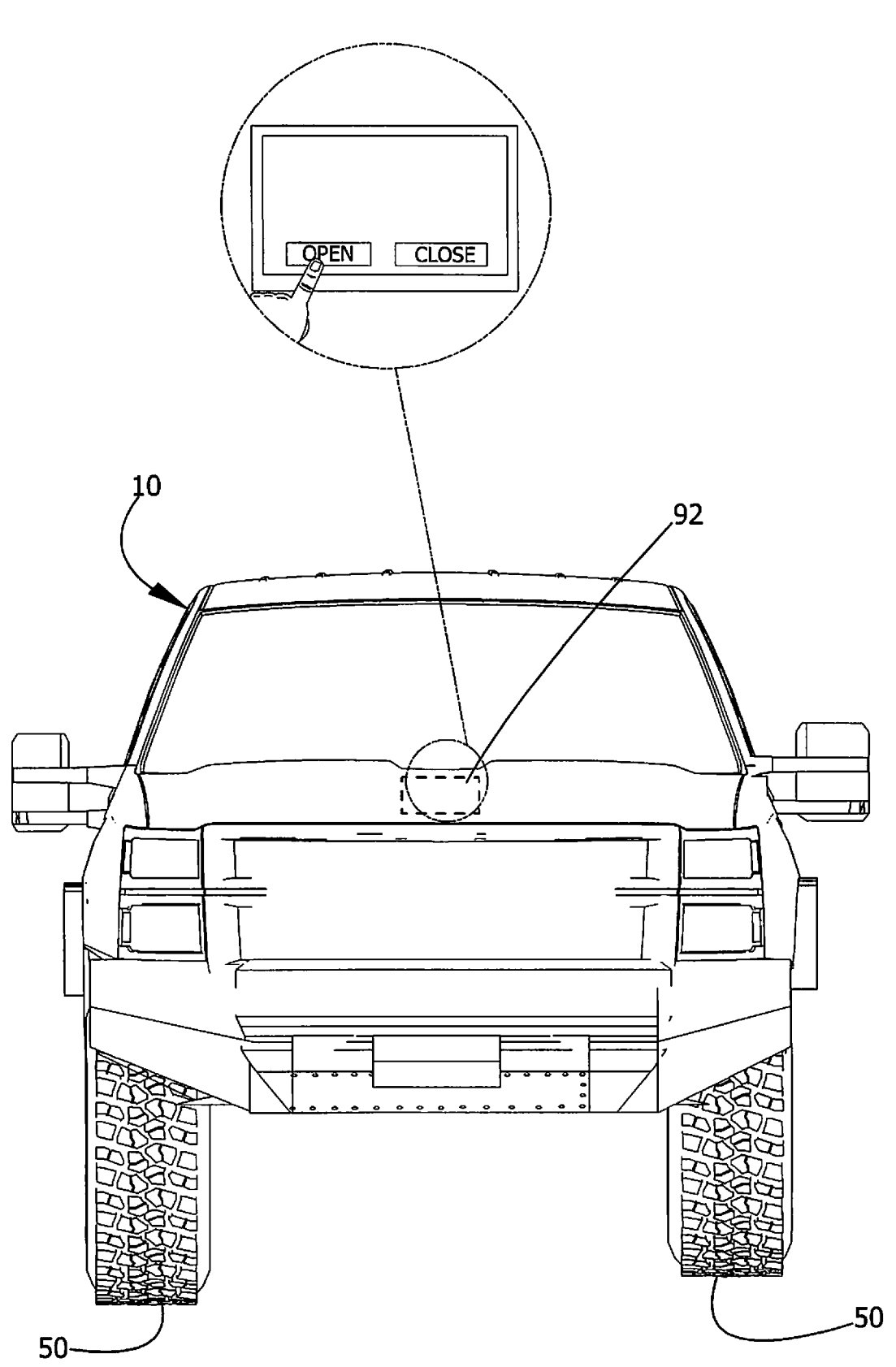
FIG. 3 is a front view of an embodiment of the disclosure.
Figure 4:
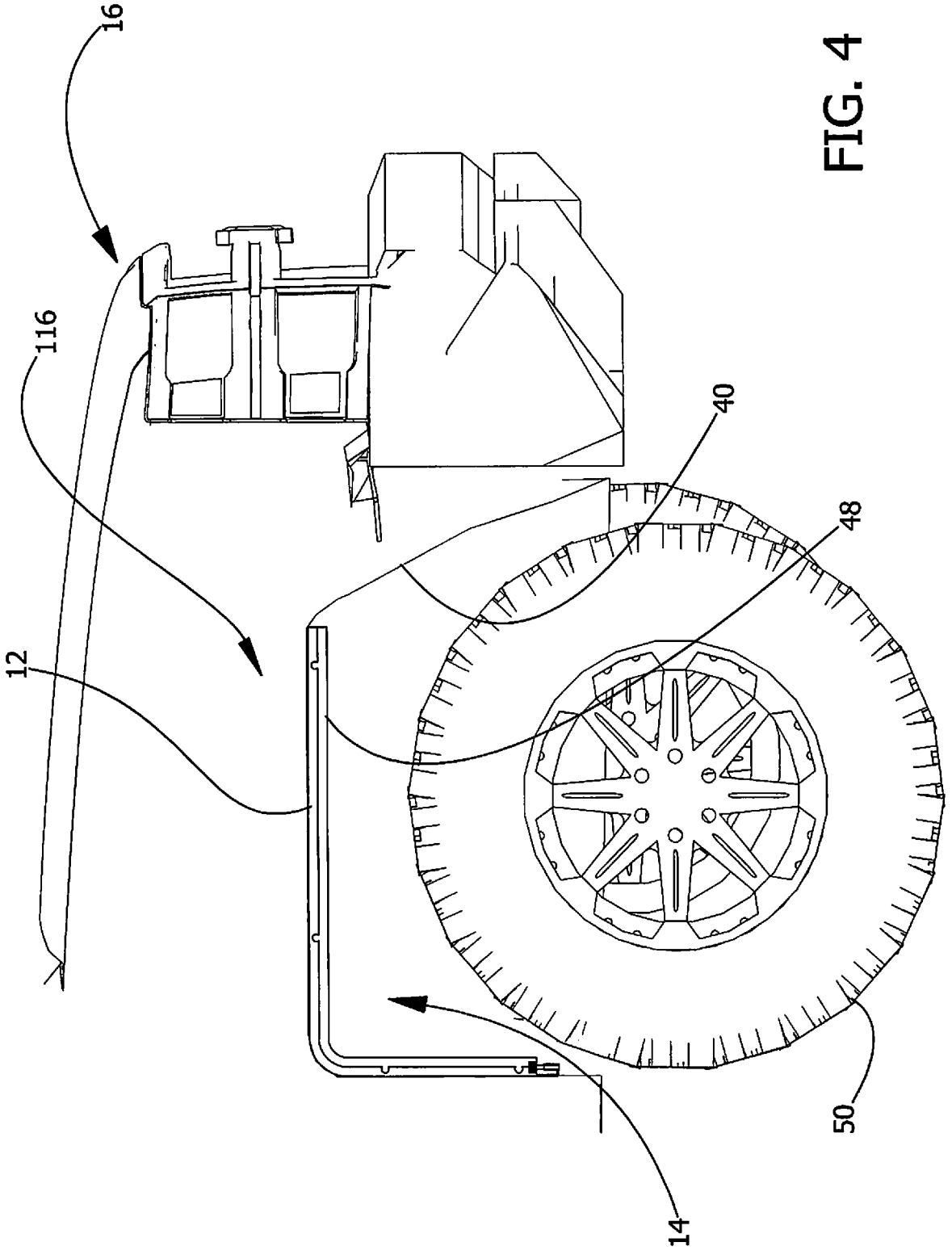
FIG. 4 is a right side view of an embodiment of the disclosure.
Figure 5:
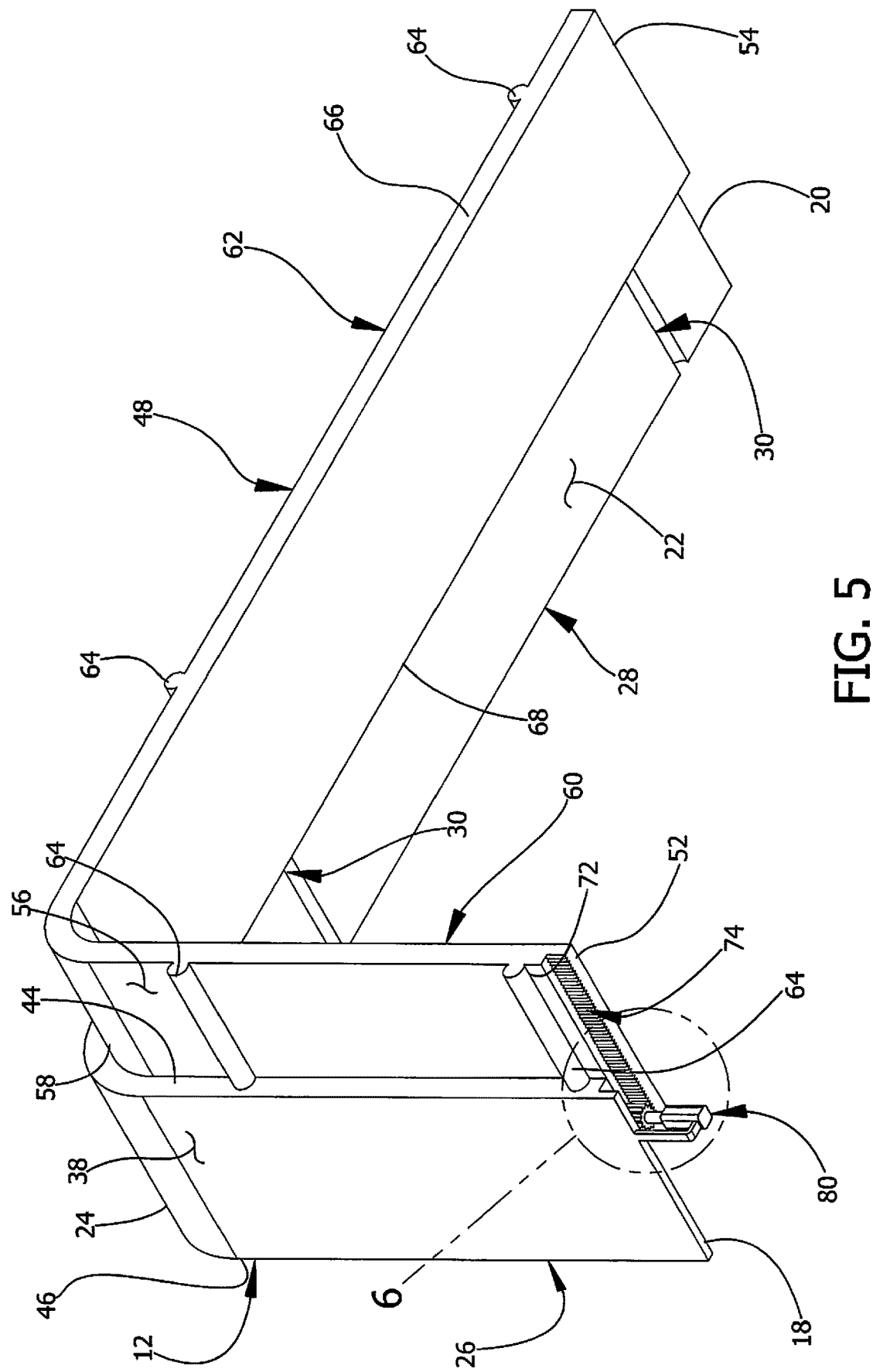
FIG. 5 is a back perspective view of a mounting track and a fender flare of an embodiment of the disclosure.
Figure 6:
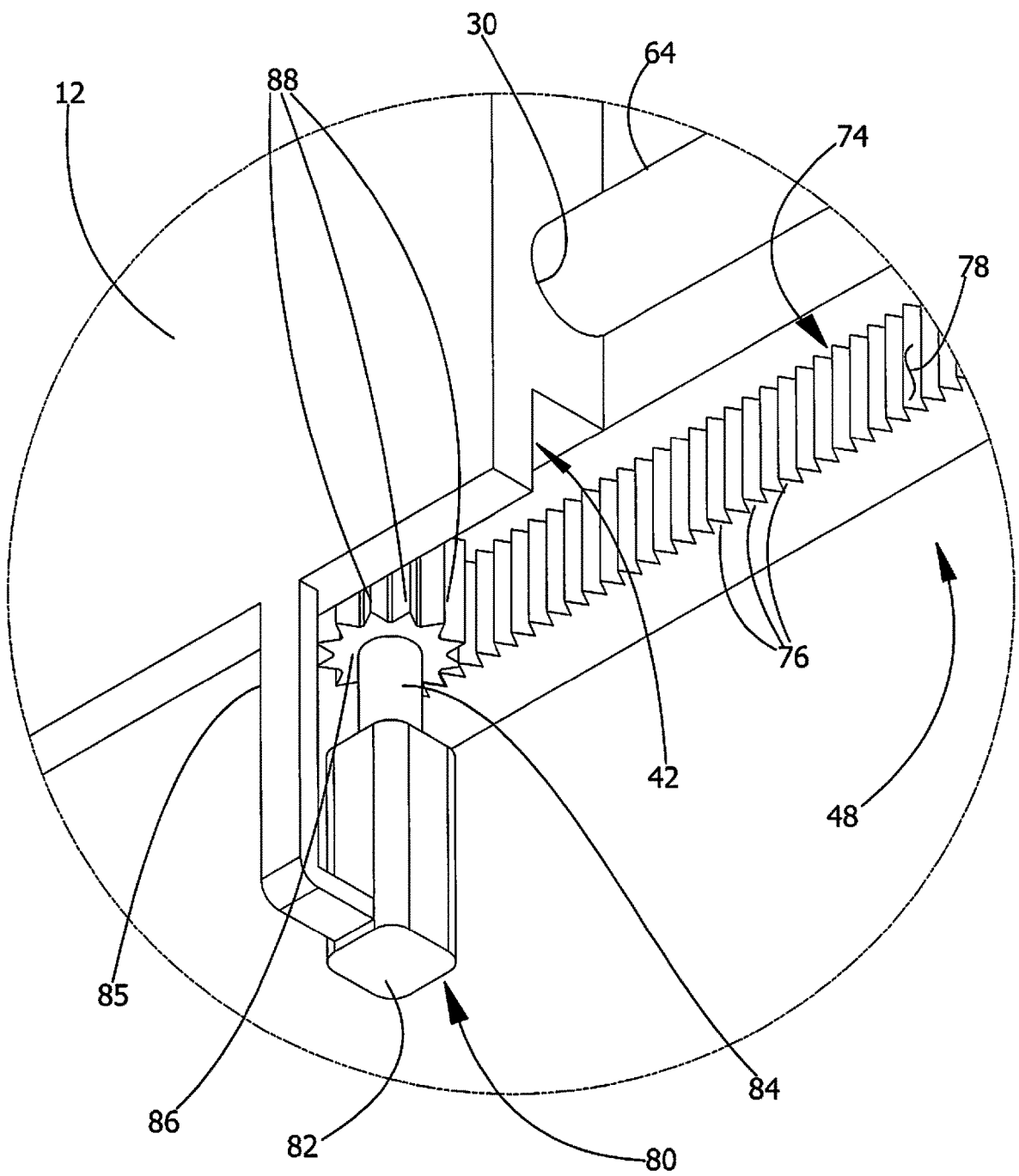
FIG. 6 is a magnified detail view taken from circle 6 of FIG. 5 of an embodiment of the disclosure.
Figure 7:
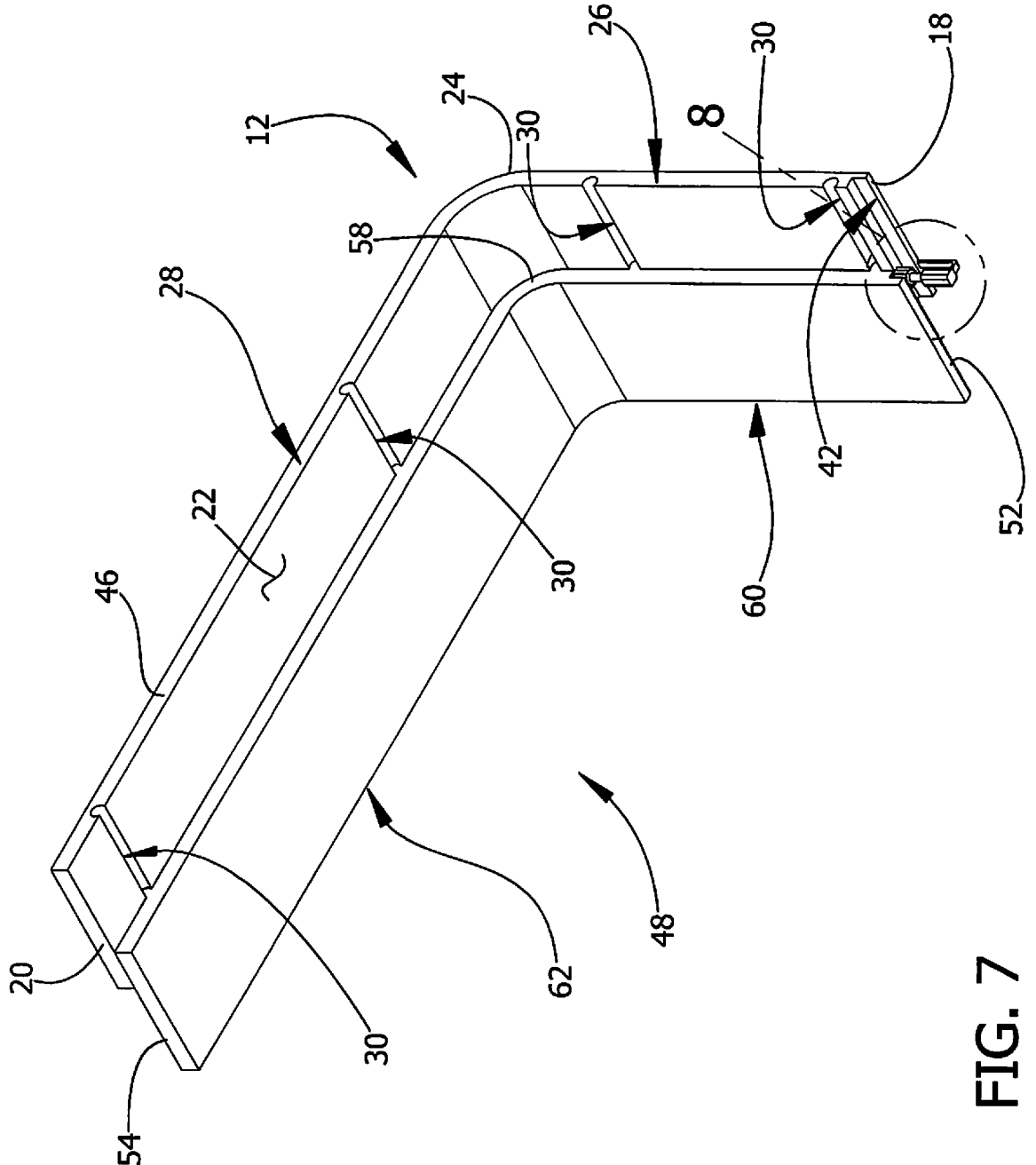
FIG. 7 is a bottom perspective view of an embodiment of the disclosure.
Figure 8:
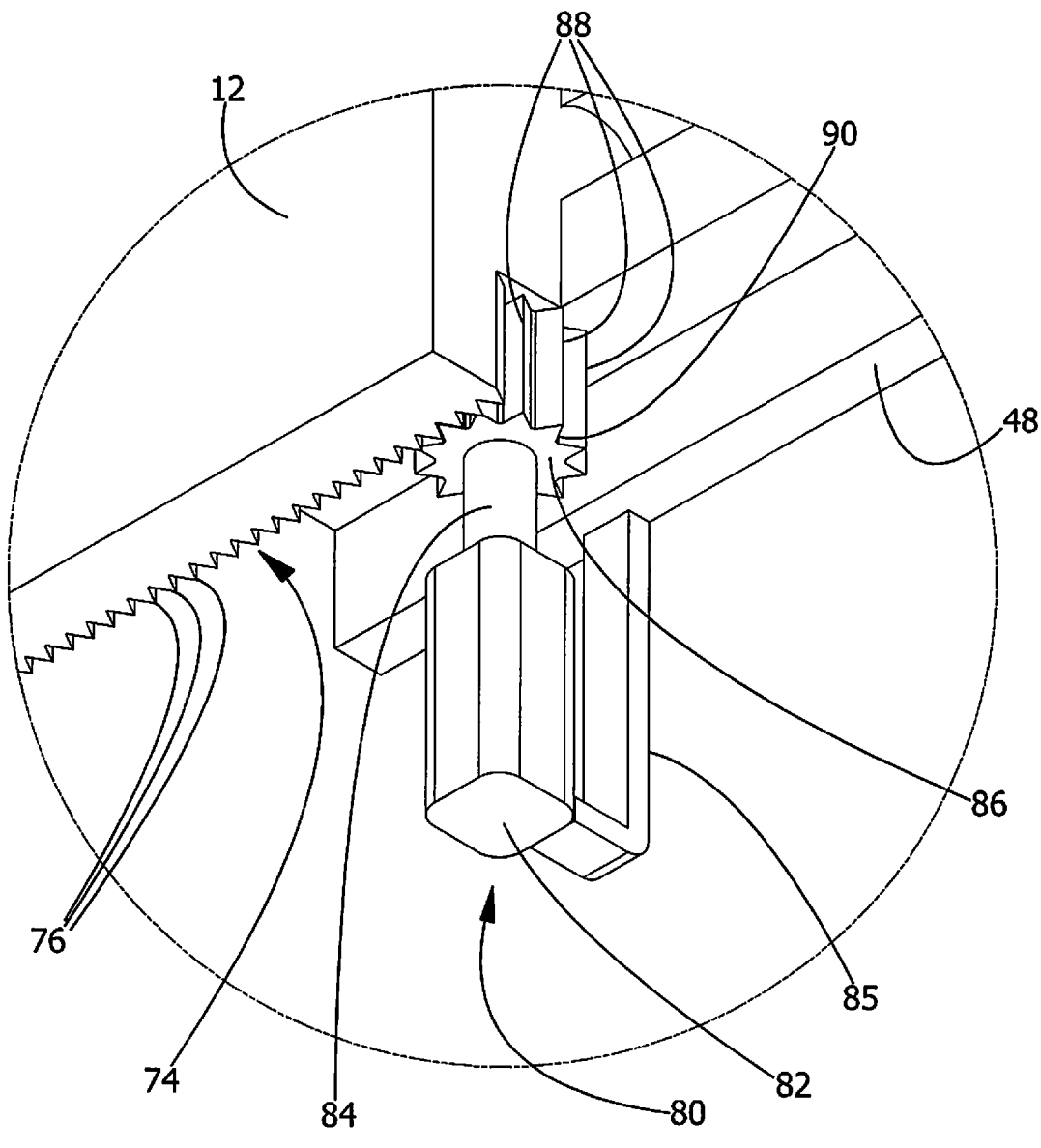
FIG. 8 is a magnified detail view taken from circle 8 of FIG. 7 of an embodiment of the disclosure.
Figure 9:
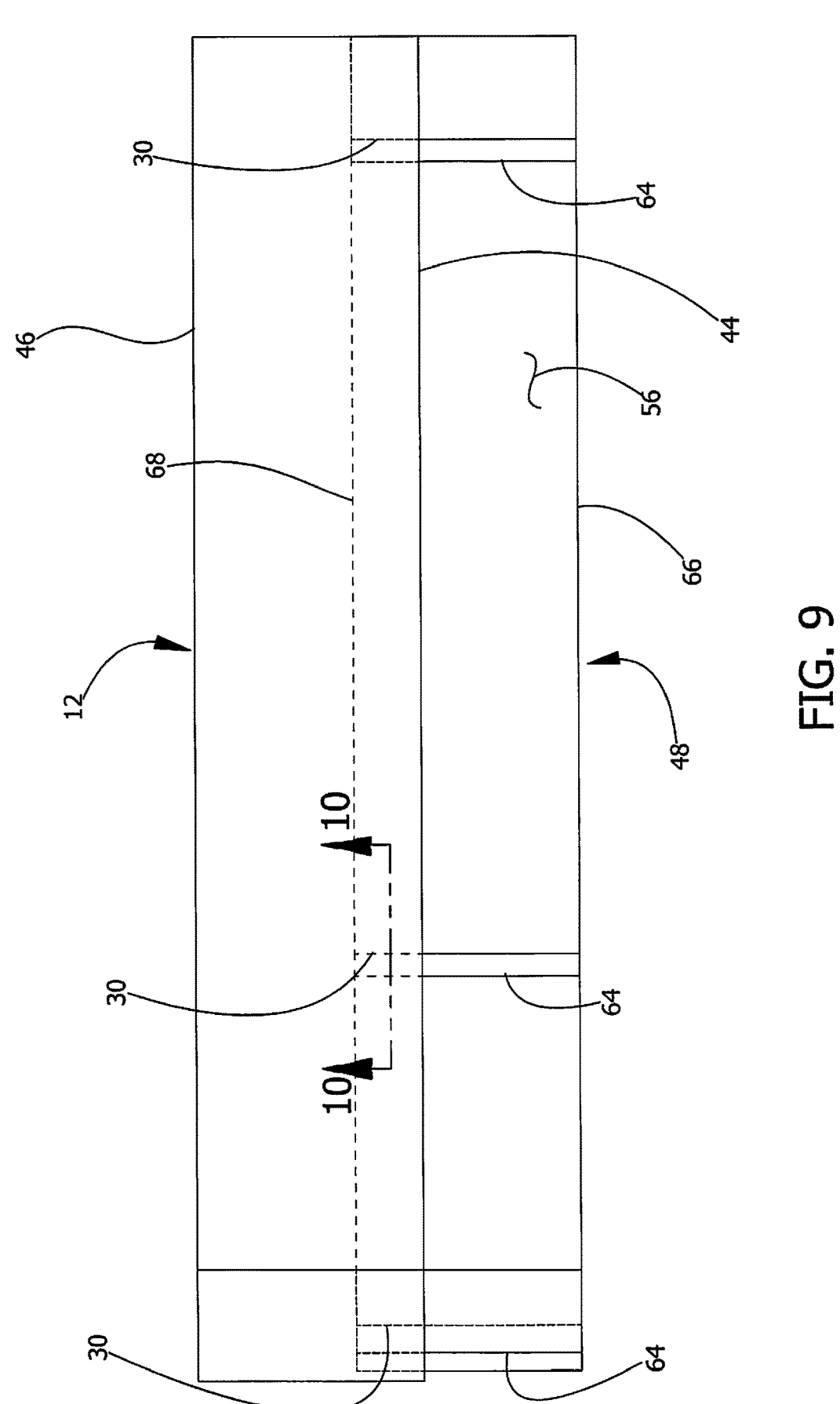
FIG. 9 is a top phantom view of a mounting track and a fender flare of an embodiment of the disclosure.
Figure 10:
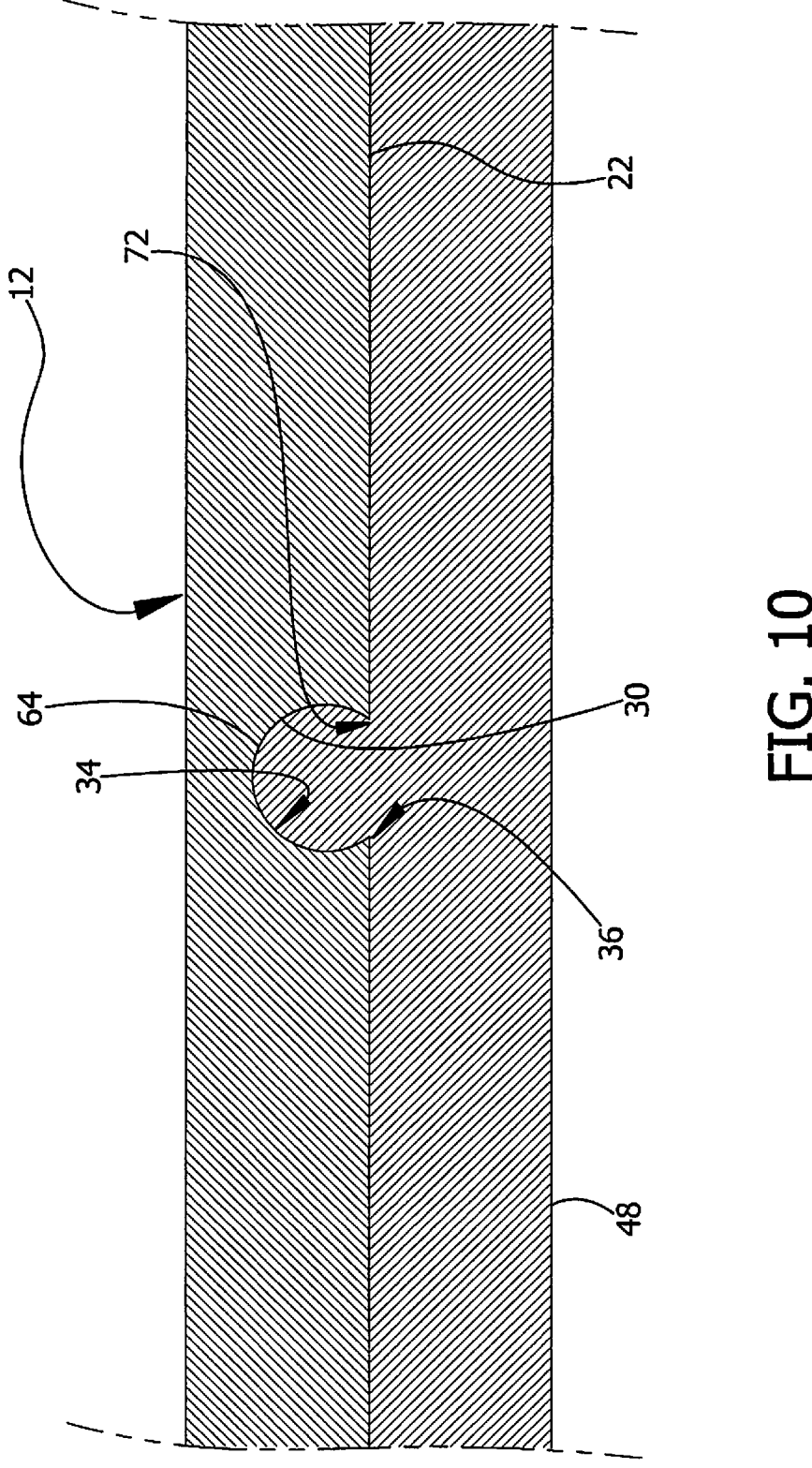
FIG. 10 is a cross sectional view taken along line 10-10 of FIG. 9 of an embodiment of the disclosure.
Figure 11:
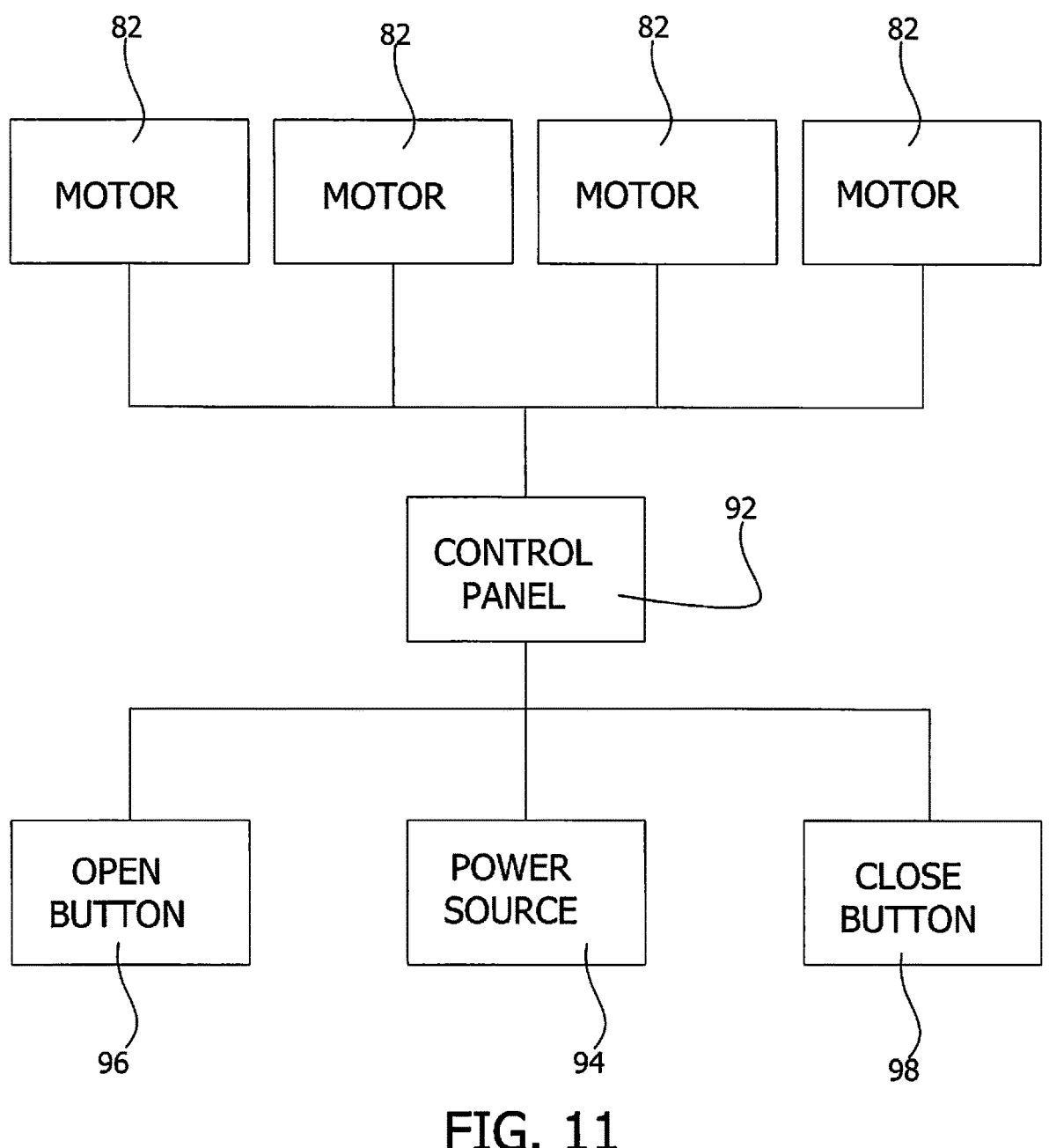
FIG. 11 is a schematic view of an embodiment of the disclosure.

With reference now to the drawings, and in particular to FIGS. 1 through 13 thereof, a new fender flare device embodying the principles and concepts of an embodiment of the disclosure and generally designated by the reference numeral 10 will be described.

As best illustrated in FIGS. 1 through 13, the retractable fender flare device 10 generally comprises a plurality of mounting tracks 12 each mounted in a respective one of a plurality of wheel wells 14 in a vehicle 16. The vehicle 16 may be a pickup truck, a sport utility vehicle or other type of motorized vehicle that is commonly driven offroad for recreational purposes and which is additionally commonly driven on public roadways. Each of the plurality of mounting tracks 12 has a primary end 18, a secondary end 20 and bottom surface 22 extending between the primary end 18 and the secondary end 20. Each of the plurality of mounting tracks 12 has a bend 24 that defines a primary section 26 of the mounting tracks 12 which is oriented at an angle with a secondary section 28 of the mounting tracks 12. The primary section 26 is associated with the primary end 18 and the secondary section 28 is associated with the secondary end 20. Furthermore, the bend 24 in each of the plurality of mounting tracks 12 is positioned closer to the primary end 18 than the secondary end 20.

Each of the plurality of mounting tracks 12 has a plurality of slots 30 each recessed into the bottom surface 22 of the mounting tracks 12. The slots 30 on a respective mounting track 12 are spaced apart from each other and are distributed between the primary end 18 and the secondary end 20. Each of the plurality of slots 30 has a bounding surface 34 that is concavely arcuate with respect to the bottom surface 22 of the respective mounting track 12. Additionally, the bounding surface 34 of each of the plurality of slots 30 has a diameter that is greater than an entry 36 into the plurality of slots 30 such that each of the plurality of slots 30 has a circular shape. An upper surface 38 of each of the plurality of mounting tracks 12 is attached to a bounding surface 40 of a respective one of the plurality of wheel wells 14 in the vehicle 16. Each of the plurality of mounting tracks 12 has a recess 42 extending into the bottom surface 22. The recess 42 in each of the plurality of mounting tracks 12 is aligned with the primary end 18 and extends between a primary lateral edge 44 and a secondary lateral edge 46 of the mounting tracks 12.

A plurality of fender flares 48 is provided and each of the plurality of fender flares 48 is movably attached to a respective one of the mounting tracks 12 such that each of the plurality of fender flares 48 is positioned in a respective one of the plurality of wheel wells 14. Each of the plurality of fender flares 48 is positionable in a deployed position having each of the plurality of fender flares 48 extending outwardly from the respective wheel well 14. In this way each of the plurality of fender flares 48 can protect the vehicle 16 from dirt and debris that is kicked up by tires 50 of the vehicle 16. Conversely, each of the plurality of fender flares 48 is positionable in a retracted position having each of the plurality of fender flares 48 is stored in the respective wheel well 14.

Each of the plurality of fender flares 48 has a first end 52, a second end 54 and a top surface 56 extending between the first end 52 and the second end 54. Each of the plurality of fender flares 48 has a bend 58 defining a first section 60 of the fender flares 48 that is oriented at an angle with a second section 62 of the fender flares 48. The first section 60 is associated with the first end 52 and the second section 62 is associated with the second end 54. The bend 58 in each of the plurality of fender flares 48 is positioned closer to the first end 52 than the second end 54.

Each of the plurality of fender flares 48 has a plurality of lobes 64 each extending upwardly from the top surface 56 and each of the plurality of lobes 64 on a respective one of the plurality of fender flares 48 extends between a first lateral edge 66 and a second lateral edge 68 of the fender flares 48. The lobes 64 on each of a respective fender flare 48 are spaced apart from each other and are distributed between the first end 52 and the second end 54 of the respective fender flare 48. Each of the plurality of lobes 64 has a diameter that is greater than a connection point 72 where the plurality of lobes 64 is attached to the top surface 56 of the respective fender flare 48 such that each of the plurality of lobes 64 has a circular shape. Each of the plurality of lobes 64 on the top surface 56 of a respective one of the plurality of fender flares 48 is positioned in a respective one of the plurality of slots 30 in the bottom surface 22 of a respective one of the plurality of mounting tracks 12 such that each of the plurality of fender flares 48 is slidably retained on the respective mounting track 12.

A plurality of rail gears 74 is provided and each of the plurality of rail gears 74 is attached to the top surface 56 of a respective one of the plurality of fender flares 48. Each of the plurality of rail gears 74 extends between the first lateral edge 66 and the second lateral edge 68 of the respective fender flare 48. Each of the rail gears 74 is aligned with the first end 52 of the respective fender flare 48. Additionally, each of the plurality of rail gears 74 has a plurality of teeth 76 that are evenly spaced apart from each other and are distributed along an exposed surface 78 of the plurality rail gears 74.

A plurality of actuators 80 is provided and each of the actuators 80 is attached to a respective one of the mounting tracks 12. Each of the plurality of actuators 80 is in mechanical communication with the fender flare 48 that is movably attached to the respective mounting track 12. Each of the plurality of actuators 80 is actuatable into a deploying condition such that each of the plurality of actuators 80 urges the respective fender flare 48 into the deployed position. Conversely, each of the plurality of actuators 80 is actuatable into a retracting condition such that each of the plurality of actuators 80 urges the respective fender flare 48 into the retracted position.

Each of the plurality of actuators 80 comprises a motor 82 that is attached to a respective one of the mounting tracks 12 and the motor 82 is actuatable to rotate in a first direction or a second direction. The motor 82 may comprise a two direction electric motor or the like. Each of the actuators 80 includes an output shaft 84 that is attached to the motor 82 such that the motor 82 rotates the output shaft 84 in a first direction or a second direction when the motor 82 is actuated to rotate in the first direction or the second direction. Additionally, each of the actuators 80 includes a drive gear 86 that is attached to the output shaft 84 such that the drive gear 86 is positioned in the recess 42 in the bottom surface 22 of a respective one of the plurality of mounting tracks 12. As is most clearly shown in FIGS. 6 and 8, a mounting tab 85 extends downwardly from the first end 52 of each of the fender flares 48 and the motor 82 is attached to a distal end 87 of the mounting tab 85.

The drive gear 86 has a plurality of teeth 88 which are evenly spaced apart from each other and are distributed around an outer surface 90 of the drive gear 86. The teeth 88 on the outer surface 90 of the drive gear 86 engage the teeth 76 on the exposed surface 78 of a respective one of the rail gears 74. Thus, the fender flare 48 upon which the respective rail gear 74 is positioned is urged into the deployed position when the motor 82 rotates in the first direction. Conversely, the fender flare 48 upon which the respective rail gear 74 is positioned is urged into the retracted position when the motor 82 rotates in the second direction.

A control panel 92 is provided and the control panel 92 is mounted within a cab of the vehicle 16 such that the control panel 92 is accessible to a driver of the vehicle 16. The control panel 92 is in communication with each the plurality of actuators 80. Each of the plurality of actuators 80 is actuated into the into the deploying condition when the control panel 92 is manipulated to communicate a deploy command to the plurality of actuators 80. Conversely, each of the plurality of actuators 80 is actuated into the retracting condition when the control panel 92 is manipulated to communicate a retract command to the plurality of actuators 80.

The control panel 92 is electrically coupled to a power source 94 comprising an electrical system of the vehicle 16 and the control panel 92 is electrically coupled to the motor 82 of each of the plurality of actuators 80. The motor 82 of each of the plurality of actuators 80 rotates in the first direction when an open button 96 on the control panel 92 is manipulated. Conversely, the motor 82 of each of the plurality of actuators 80 rotates in the second direction when a close button 98 on the control panel 92 is manipulated. The control panel 92 may comprise a touch screen which displays the open button 96 and the close button 98 as icons or the control panel 92 may comprise an analog control panel with physical buttons that can be depressed.

Figure 12:
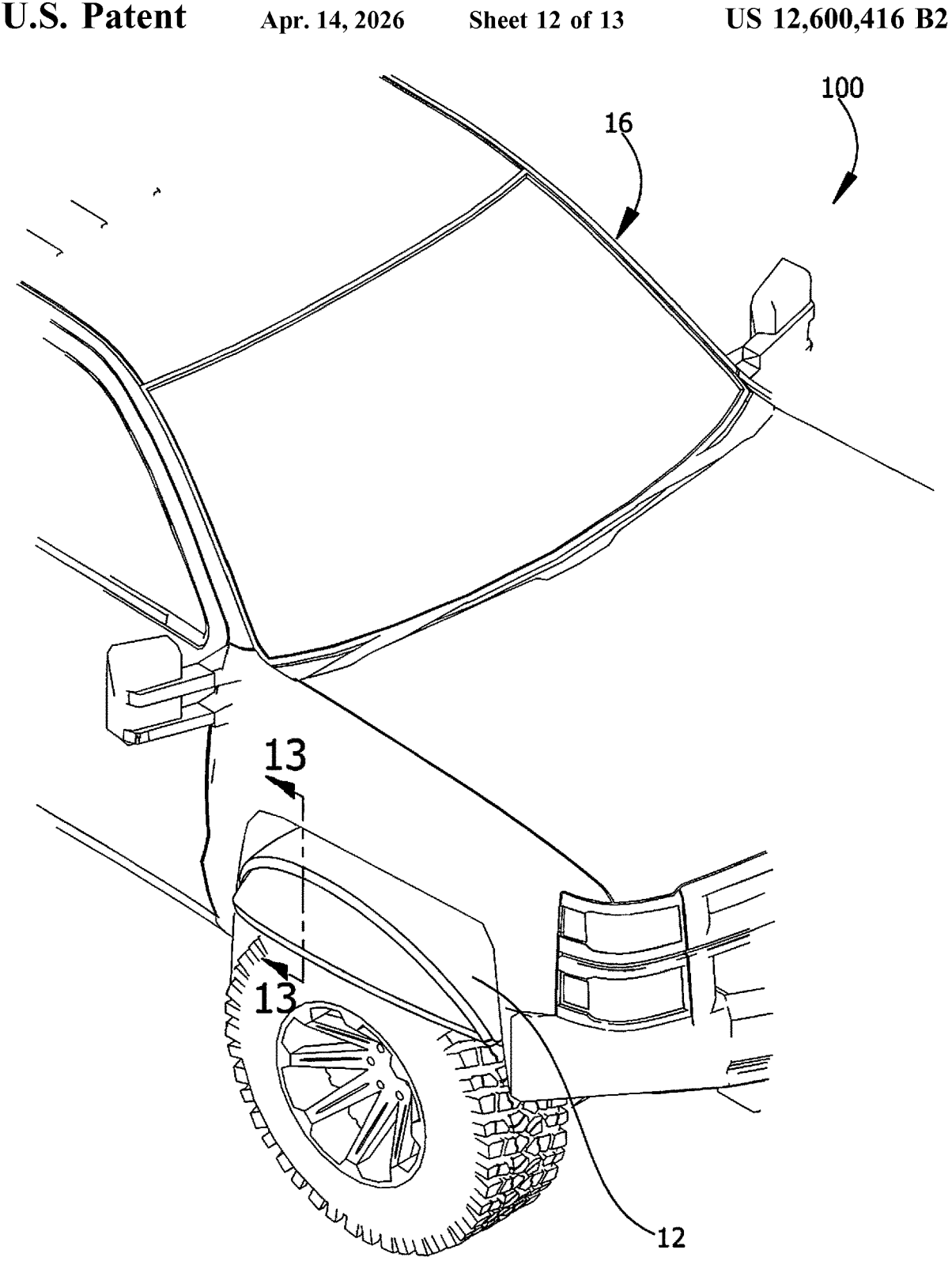
FIG. 12 is a perspective view of an alternative embodiment of the disclosure.
Figure 13:
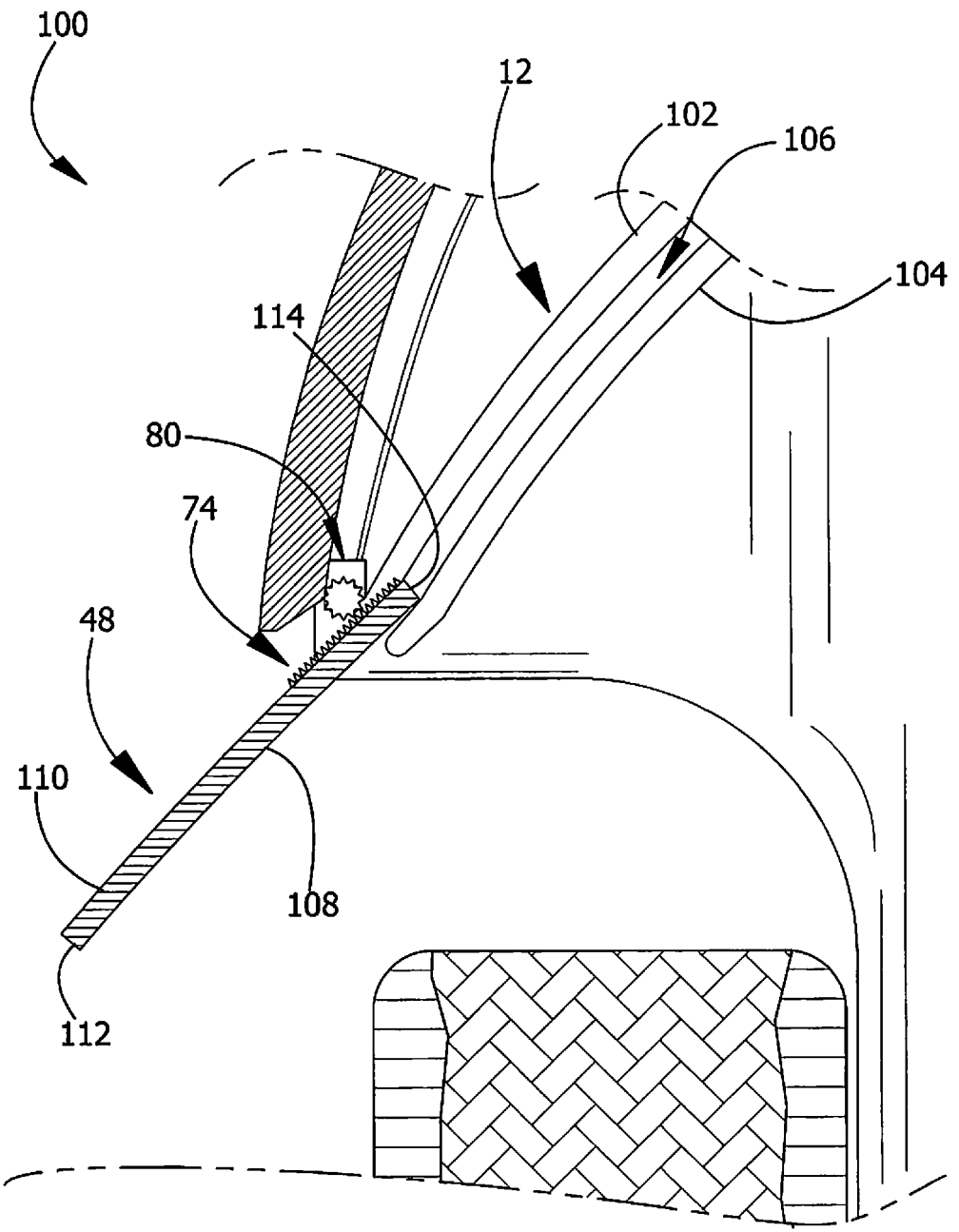
FIG. 13 is a cross sectional view taken along line 13-13 of FIG. 12 of an alternative embodiment of the disclosure.

In an alternative embodiment 100 as shown in FIGS. 12 and 13, each of the plurality of mounting tracks 12 comprises a top panel 102 that is spaced from a bottom panel 104 to define a fender flare space 106 between the top panel 102 and the bottom panel 104. Additionally, each of the plurality of mounting tracks 12 is oriented to angle upwardly in the respective wheel well 14. Continuing in the alternative embodiment 100, each of the plurality of fender flares 48 comprises a panel 108 that is slidably disposed in the fender flare space 106 defined in a respective one of the mounting tracks 12. Additionally, the panel 108 is curved such that the panel 108 defines a half shell. Each of the plurality of rail gears 74 is positioned on a top surface 110 the panel 108 comprising a respective one of the fender flares 48 and each of the rail gears 74 is oriented to extend substantially between a front edge 112 and a back edge 114 of the panel 108 comprising the respective fender flare 48. As shown in FIG. 13, the drive gear 86 of each of the plurality of actuators 80 engages a respective one of the rail gears 74.

In use, the close button 98 is manipulated on the control panel 92 to urge the plurality of fender flares 48 into the retracted position when the vehicle 16 is driving on a public roadway, for example, or other situation that would not involve dirt and debris being kicked up by the tires 50 of the vehicle 16. The open button 96 is manipulated on the control panel 92 to urge the plurality of fender flares 48 into the deployed position when the vehicle 16 is being driven off road in muddy conditions, for example, or other situation that is likely to involve dirt and debris being kicked up by the tires 50 of the vehicle 16. In this way the fender flares 48 inhibit the dirt and debris from contacting body panels 116 of the vehicle 16 thereby reducing the likelihood of the body panels 116 becoming covered with dirt and debris as well as protecting the body panels 116 from being scratched, dented or otherwise damaged by the dirt and debris.

It is generally contemplated that the fender flares 48 may also be manually adjusted for position either in an alternative or consistent with the above described actuators and mechanics. Further, the mechanics may be achieved utilizing electrical, hydraulic, or air systems for operations of the actuators as described above.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A retractable fender flare device for facilitating a fender flare on a vehicle to be selectively deployed to protect the vehicle from dirt and debris that are kicked up by tires of the vehicle, said device comprising:

a plurality of mounting tracks, each of said plurality of mounting tracks being mounted in a respective one of a plurality of wheel wells in a vehicle;

a plurality of fender flares, each of said plurality of fender flares being movably attached to a respective one of said mounting tracks such that each of said plurality of fender flares is positioned in a respective one of said plurality of wheel wells, each of said plurality of fender flares being positionable in a deployed position having each of said plurality of fender flares extending outwardly from said respective wheel well wherein each of said plurality of fender flares is configured to protect said vehicle from dirt and debris that is kicked up by tires of said vehicle, each of said plurality of fender flares being positionable in a retracted position having each of said plurality of fender flares being stored in said respective wheel well;

a plurality of actuators, each of said actuators being attached to a respective one of said mounting tracks, each of said plurality of actuators being in mechanical communication with said fender flare that is movably attached to said respective mounting track, each of said plurality of actuators being actuatable into a deploying condition such that each of said plurality of actuators urges said respective fender flare into said deployed position, each of said plurality of actuators being actuatable into a retracting condition such that each of said plurality of actuators urges said respective fender flare into said retracted position; and a control panel being mounted within a cab of said vehicle wherein said control panel is configured to be accessible to a driver of said vehicle, said control panel being in communication with each said plurality of actuators, each of said plurality of actuators being actuated into said into said deploying condition when said control panel is manipulated to communicate a deploy command to said plurality of actuators, each of said plurality of actuators being actuated into said retracting condition when said control panel is manipulated to communicate a retract command to said plurality of actuators.

2. The device according to claim 1, wherein:

each of said plurality of mounting tracks has a primary end and a secondary end and bottom surface extending between said primary end and said secondary end;

each of said plurality of mounting tracks has a bend defining a primary section of said mounting tracks being oriented at an angle with a secondary section of said mounting tracks;

said primary section is associated with said primary end;

said secondary section is associated with said secondary end;

said bend in each of said plurality of mounting tracks is positioned closer to said primary end than said secondary end;

each of said plurality of mounting tracks has a plurality of slots each being recessed into said bottom surface of said mounting tracks;

said slots on a respective mounting track are spaced apart from each other and are distributed between said primary end and said secondary end;

an upper surface of each of said plurality of mounting tracks being attached to a bounding surface of a respective one of said plurality of wheel wells in said vehicle;

each of said plurality of mounting tracks has a recess extending into said bottom surface; and said recess in each of said plurality of mounting tracks is aligned with said primary end and extending between a primary lateral edge and a secondary lateral edge of said mounting tracks.

3. The device according to claim 2, wherein:

each of said plurality of slots has a bounding surface that is concavely arcuate with respect to said bottom surface of said respective mounting track; and said bounding surface of each of said plurality of slots has a diameter being greater than an entry into said plurality of slots such that each of said plurality of slots has a circular shape.

4. The device according to claim 1, wherein:

each of said plurality of fender flares has a first end and a second end and top surface extending between said first end and said second end;

each of said plurality of fender flares has a bend defining a first section of said fender flares being oriented at an angle with a second section of said fender flares;

said first section is associated with said first end;

said second section is associated with said second end;

said bend in each of said plurality of fender flares is positioned closer to said first end than said second end;

each of said plurality of fender flares has a plurality of lobes each extending upwardly from said top surface;

each of said plurality of lobes on a respective one of said plurality of fender flares extends between a first lateral edge and a second lateral edge of said fender flares;

said plurality of lobes on each of a respective fender flare is spaced apart from each other and is distributed between said first end and said second end of said respective fender flare; and each of said plurality of lobes has a diameter being greater than a connection point where said plurality of lobes is attached to said top surface of said respective fender flare such that each of said plurality of lobes has a circular shape.

5. The device according to claim 4, wherein:

each of said plurality of mounting tracks has a plurality of slots being recessed into a bottom surface of said mounting tracks; and each of said plurality of lobes on said top surface of a respective one of said plurality of fender flares is positioned in a respective one of said plurality of slots in said bottom surface of a respective one of said plurality of mounting tracks such that each of said plurality of fender flares is slidably retained on said respective mounting track.

6. The device according to claim 4, wherein:

said device includes a plurality of rail gears;

each of said plurality of rail gears is attached to said top surface of a respective one of said plurality of fender flares;

each of said plurality of rail gears extends between said first lateral edge and said second lateral edge of said respective fender flare;

each of said rail gears is aligned with said first end of said respective fender flare; and each of said plurality of rail gears has a plurality of teeth being evenly spaced apart from each other and being distributed along an exposed surface of said plurality rail gears.

7. The device according to claim 6, wherein:

each of said plurality of actuators includes a motor being attached to a respective one of said mounting tracks, said motor being actuatable to rotate in a first direction or a second direction;

each of said plurality of actuators includes an output shaft being attached to said motor such that said motor rotates said output shaft in a first direction or a second direction when said motor is actuated to rotate in said first direction or said second direction;

each of said plurality of actuators includes a drive gear being attached to said output shaft;

said drive gear has a plurality of teeth being evenly spaced apart from each other and being distributed around an outer surface of said drive gear;

said teeth on said outer surface of said drive gear engages said teeth on said exposed surface of a respective one of said rail gears;

said fender flare upon which said respective rail gear is positioned is urged into said deployed position when said motor rotates in said first direction; and said fender flare upon which said respective rail gear is positioned is urged into said retracted position when said motor rotates in said second direction.

8. The device according to claim 7, wherein:

said control panel is electrically coupled to a power source comprising an electrical system of said vehicle;

said control panel is electrically coupled to said motor of each of said plurality of actuators;

said motor of each of said plurality of actuators rotates in said first direction when an open button on said control panel is manipulated; and said motor of each of said plurality of actuators rotates in said second direction when a close button on said control panel is manipulated.

9. A retractable fender flare device for facilitating a fender flare on a vehicle to be selectively deployed to protect the vehicle from dirt and debris that are kicked up by tires of the vehicle, said device comprising:

a plurality of mounting tracks, each of said plurality of mounting tracks being mounted in a respective one of a plurality of wheel wells in a vehicle, each of said plurality of mounting tracks having a primary end and a secondary end and bottom surface extending between said primary end and said secondary end, each of said plurality of mounting tracks having a bend defining a primary section of said mounting tracks being oriented at an angle with a secondary section of said mounting tracks, said primary section being associated with said primary end, said secondary section being associated with said secondary end, said bend in each of said plurality of mounting tracks being positioned closer to said primary end than said secondary end, each of said plurality of mounting tracks having a plurality of slots each being recessed into said bottom surface of said mounting tracks, said slots on a respective mounting track being spaced apart from each other and being distributed between said primary end and said secondary end, each of said plurality of slots having a bounding surface being concavely arcuate with respect to said bottom surface of said respective mounting track, said bounding surface of each of said plurality of slots having a diameter being greater than an entry into said plurality of slots such that each of said plurality of slots has a circular shape, an upper surface of each of said plurality of mounting tracks being attached to a bounding surface of a respective one of said plurality of wheel wells in said vehicle, each of said plurality of mounting tracks having a recess extending into said bottom surface, said recess in each of said plurality of mounting tracks being aligned with said primary end and extending between a primary lateral edge and a secondary lateral edge of said mounting tracks;

a plurality of fender flares, each of said plurality of fender flares being movably attached to a respective one of said mounting tracks such that each of said plurality of fender flares is positioned in a respective one of said plurality of wheel wells, each of said plurality of fender flares being positionable in a deployed position having each of said plurality of fender flares extending outwardly from said respective wheel well wherein each of said plurality of fender flares is configured to protect said vehicle from dirt and debris that is kicked up by tires of said vehicle, each of said plurality of fender flares being positionable in a retracted position having each of said plurality of fender flares being stored in said respective wheel well, each of said plurality of fender flares having a first end and a second end and top surface extending between said first end and said second end, each of said plurality of fender flares having a bend defining a first section of said fender flares being oriented at an angle with a second section of said fender flares, said first section being associated with said first end, said second section being associated with said second end, said bend in each of said plurality of fender flares being positioned closer to said first end than said second end, each of said plurality of fender flares having a plurality of lobes each extending upwardly from said top surface, each of said plurality of lobes on a respective one of said plurality of fender flares extending between a first lateral edge and a second lateral edge of said fender flares, said plurality of lobes on each of a respective fender flare being spaced apart from each other and being distributed between said first end and said second end of said respective fender flare, each of said plurality of lobes having a diameter being greater than a connection point where said plurality of lobes is attached to said top surface of said respective fender flare such that each of said plurality of lobes has a circular shape;

wherein each of said plurality of lobes on said top surface of a respective one of said plurality of fender flares is positioned in a respective one of said plurality of slots in said bottom surface of a respective one of said plurality of mounting tracks such that each of said plurality of fender flares is slidably retained on said respective mounting track;

a plurality of rail gears, each of said plurality of rail gears being attached to said top surface of a respective one of said plurality of fender flares, each of said plurality of rail gears extending between said first lateral edge and said second lateral edge of said respective fender flare, each of said rail gears being aligned with said first end of said respective fender flare, each of said plurality of rail gears having a plurality of teeth being evenly spaced apart from each other and being distributed along an exposed surface of said plurality rail gears;

a plurality of actuators, each of said actuators being attached to a respective one of said mounting tracks, each of said plurality of actuators being in mechanical communication with said fender flare that is movably attached to said respective mounting track, each of said plurality of actuators being actuatable into a deploying condition such that each of said plurality of actuators urges said respective fender flare into said deployed position, each of said plurality of actuators being actuatable into a retracting condition such that each of said plurality of actuators urges said respective fender flare into said retracted position, each of said plurality of actuators comprising:

a motor being attached to a respective one of said mounting tracks, said motor being actuatable to rotate in a first direction or a second direction;

an output shaft being attached to said motor such that said motor rotates said output shaft in a first direction or a second direction when said motor is actuated to rotate in said first direction or said second direction; and a drive gear being attached to said output shaft such that said drive gear is positioned in said recess in said bottom surface of a respective one of said plurality of mounting tracks, said drive gear having a plurality of teeth being evenly spaced apart from each other and being distributed around an outer surface of said drive gear, said teeth on said outer surface of said drive gear engaging said teeth on said exposed surface of a respective one of said rail gears, said fender flare upon which said respective rail gear is positioned being urged into said deployed position when said motor rotates in said first direction, said fender flare upon which said respective rail gear is positioned being urged into said retracted position when said motor rotates in said second direction; and a control panel being mounted within a cab of said vehicle wherein said control panel is configured to be accessible to a driver of said vehicle, said control panel being in communication with each said plurality of actuators, each of said plurality of actuators being actuated into said into said deploying condition when said control panel is manipulated to communicate a deploy command to said plurality of actuators, each of said plurality of actuators being actuated into said retracting condition when said control panel is manipulated to communicate a retract command to said plurality of actuators, said control panel being electrically coupled to a power source comprising an electrical system of said vehicle, said control panel being electrically coupled to said motor of each of said plurality of actuators, said motor of each of said plurality of actuators rotating in said first direction when an open button on said control panel is manipulated, said motor of each of said plurality of actuators rotating in said second direction when a close button on said control panel is manipulated.

10. The device according to claim 9, wherein:

each of said plurality of mounting tracks comprises a top panel being spaced from a bottom panel to define a fender flare space between said top panel and said bottom panel; and each of said plurality of mounting tracks is oriented to angle upwardly in said respective wheel well.

11. The device according to claim 10, wherein:

each of said plurality of fender flares comprises a panel being slidably disposed in said fender flare space defined in a respective one of said mounting tracks, said panel being curved such that said panel defines a half shell; and each of said plurality of rail gears being positioned on a top surface of a respective one of said panel comprising a respective one of said fender flares, each of said rail gears being oriented to extend between a front edge and a back edge of said panel comprising said respective fender flare.

12. The device according to claim 11, wherein said drive gear of each of said plurality of actuators engages a respective one of said rail gears.

* * * * *